Patented Apr. 30, 1935

1,999,295

UNITED STATES PATENT OFFICE 1,999,295

METHOD AND COMPOSITION FOR USE IN THE CEMENT ATTACHING OF SHOE PARTS

Joseph W. Johnson, Beverly, Mass., assignor to United Shoe Machinery Corporation, Paterson, N. J., a corporation of New Jersey No Drawing. Application August 14, 1933, Serial No. 685,082

15 Claims. (Cl. 154—40)

This invention relates to improvements in the cementing together of pieces of stock by cellulose derivative cements, and more particularly to methods and compositions for activating hardened cement on the stock immediately prior to placing the pieces or stock in juxtaposition and under pressure.

The invention is disclosed herein with reference to the cement attaching of soles to shoe uppers, though it should be understood that the invention in various of its phases is in no way limited to use in shoe manufacture.

In shoe manufacture, in the cement attaching of soles to shoe uppers, it has been customary to apply pyroxylin cement to the overlasted marginal portion of the shoe upper and to the marginal portion of the attaching surface of the sole and to permit the cement to dry or harden. Subsequently the cement on one or both of the shoe parts has been activated or cut with a solvent and the shoe parts then placed in juxtaposition and under pressure. The sole-attaching pressure is maintained until the activated cement sets sufficiently to hold the shoe parts together without the aid of external pressure.

An object of this invention is to provide an improved method and composition for softening or activating hardened cellulose derivative cements. A further object is to provide a cement-activating composition which may be used in sole attaching and which will activate the cement readily, which will permit ample time to assemble the shoe upper and sole after application of the activating composition, and which will require the application of sole-attaching pressure for only a short time.

These and other objects are attained by means of a composition containing methyl formate and a small amount of a dissolved cellulose derivative, for example, pyroxylin. In its preferred form the composition contains in substantial amount volatile material, having a boiling point preferably less than about 50° C., compatible and miscible with the methyl formate but non-solvent for the cellulose derivative, and particularly suitable for this purpose is methylene chloride with or without the addition of ether.

A composition prepared or compounded according to my invention when applied to the surface of hardened pyroxylin cement on a shoe sole softens or dissolves the surface portion of the hardened cement very quickly. Softening of substantially more than the surface portion of the cement is not usually desired in view of the longer time required for the softened cement to acquire sufficient adhesive strength to hold the shoe parts together without the aid of external pressure. At the same time, by the formation of a thin, fragile film or skin of pyroxylin over the applied composition, evaporation of a large proportion of the volatile constituents of the softening composition is retarded for a period sufficient to bring the shoe sole and shoe into juxtaposition and under pressure. This fragile film is disrupted upon the application of the sole-attaching pressure, whereupon the liquid constituents of the softening composition dissipate rapidly. As a consequence the cemented joint rapidly attains sufficient strength to hold the shoe parts together without the aid of pressure and therefore the attaching pressure need be applied for only a short period of time, with the attendant advantage that the pressure-applying apparatus may be released for use in attaching other shoe parts together.

The proportion of methyl formate necessary in the softening composition will depend in part upon the amount of residual solvent material in the hardened cement to which the softening composition is to be applied. In the drying or hardening of the usual pyroxylin cements the greater portion of the solvent dissipates rather quickly but after the gelatinization of the pyroxylin the dissipation of the remainder of the solvent takes place much more slowly. Thus, if the softening composition is to be applied to cement which has been drying from the liquid state for not more than a few hours, then some solvent still remains in the cement, and a smaller proportion of methyl formate is preferably employed in the softening composition than where the cement has dried for more than 12 or 14 hours and substantially all of the liquid solvent originally contained in the cement has dissipated.

A specific example of a preferred composition according to this invention, and suitable for application to cement which has been drying from the liquid state for not more than about twelve hours, is as follows:

| | Grams |
|---|---|
| Methyl formate | 200 |
| Pyroxylin | 50 |
| Ether | 150 |
| Methylene chloride | 150 |
| Total | 550 |

The above composition may be prepared by placing the ingredients in a suitable receptacle and rolling or otherwise agitating for a period of two to three hours or longer.

In terms of percentages the above composition comprises approximately 36% of the solvent methyl formate and about 27% each of the non-solvents or diluents ether and methylene chloride. In addition, the composition contains about 9% solid matter, namely, the film-forming constituent pyroxylin.

The advantageous properties of the above activating or softening composition are due in large measure to the methyl formate, which has a low boiling point (about 32.3° C.) and a high vapor pressure at room temperature, and which I have found to be an excellent and rapid solvent for hardened pyroxylin cement.

The pyroxylin in the composition given in the illustrative example is of about eighteen-seconds viscosity, but pyroxylin of other viscosities may be employed. Generally speaking, with pyroxylins of higher viscosity, a smaller quantity may be employed, and conversely, with lower viscosity pyroxylins, a larger quantity should be used. While I have used as an illustration a composition containing about 9% pyroxylin, this amount is not critical, and variations in this amount may be made to suit particular conditions. Ordinarily, the pyroxylin is present within the limits of 5% to 15%. The pyroxylin performs two principal functions, first, to form a film over the surface of the composition when applied to the cement in order to retard the evaporation of the softener until the parts to be joined are brought together into juxtaposition, and secondly, to render the cemented joint more homogeneous by filling up depressions in the surface of the hardened cement to which it is applied. As far as the first-mentioned function is concerned the pyroxylin is present in sufficient amount so that when the solvent or liquid portion of the activating composition commences to evaporate a portion of the pyroxylin gelatinizes substantially immediately and forms a frangible protecting surface film which retards evaporation of the liquid therebeneath. My invention contemplates the acceleration of the formation of this surface film and this phase of the invention will be described more fully hereinafter.

The methylene chloride in the above specific example appears to have two primary functions. In the first place, it intensifies the film-forming characteristic of the composition whereby ample time is provided to assemble the parts to be cemented, and secondly, it dissipates rapidly after the parts have been brought into juxtaposition and accelerates the dissipation of the other liquid ingredients of the composition, and thereby assists in permitting the attaching pressure to be removed after it has been applied for only a short time. The first-mentioned function comes about in this way. Methylene chloride is highly volatile (B. P. 42° C.), has a high vapor pressure at room temperature, and is a non-solvent for pyroxylin. The presence of methylene chloride in the liquid portion of the composition, therefore, tends to throw the pyroxylin out of solution or, in other words, more nearly to saturate the pyroxylin solution. When the softener is spread upon a cemented surface the highly volatile liquid portion of the composition starts to evaporate rapidly and since the pyroxylin solution is very nearly saturated the pyroxylin at the surface is very rapidly precipitated in the form of a film which of course retards further evaporation of the liquid therebeneath. As far as the second function mentioned above is concerned, when the parts to be cemented are brought into juxtaposition and under pressure the methylene chloride, due to its highly volatile nature, dissipates rapidly, and since it is not a solvent for pyroxylin, it does not exert any softening action on the pyroxylin prior to its dissipation.

I find it convenient and desirable to incorporate a substantial amount of ether in this softening composition. Ether is also highly volatile (B. P. 35° C.), has a high vapor pressure at room temperature and is not in itself a solvent for pyroxylin, although it may have some solvent action thereon in conjunction with methyl formate. Since ether is relatively inexpensive, in addition to having the other desirable chemical properties, it forms a desirable constituent of the composition.

It will be seen, therefore, that in the above composition the liquid portion, in addition to its extremely high volatility and ready dispersibility, intensifies the film-forming effect of the pyroxylin content whereby the major portion of the volatile liquid may be confined until dispersion thereof is desired, namely, until the parts to be cemented have been brought into juxtaposition and under pressure.

In carrying out the invention in the cement attaching of soles to shoe uppers, the surfaces of the hardened cement on the sole or shoe bottom or both may be coated with a composition of my invention by means of a brush or by other suitable means known to those skilled in the art. I have found it convenient to apply my composition to the cemented surface of an outsole or shoe upper by means of a machine similar to that disclosed in application Serial No. 511,808, filed January 28, 1931, in the name of A. S. Johnson.

The application of pressure between the assembled shoe parts may be carried out, for example, in a sole press such as that disclosed in United States Letters Patent No. 1,897,105, granted February 14, 1933, on an application filed in the name of Milton H. Ballard.

Having disclosed my invention, what I claim as new and desire to secure by Letters Patent of the United States is:

1. The method of softening hardened cellulose derivative cement which comprises applying to the surface of the hardened cement a solution of a cellulose derivative in a solvent containing methyl formate.

2. That improvement in methods of securing together pieces of stock wherein hardened pyroxylin cement on one or both of two pieces of stock is softened or activated and subsequently the pieces of stock are placed in juxtaposition and under pressure which comprises activating the hardened cement with methyl formate containing sufficient pyroxylin rapidly to form a film when the methyl formate is exposed to the air.

3. The method of softening hardened cellulose derivative cement which comprises applying methyl formate to the surface of the hardened cement, and retarding the evaporation of said methyl formate.

4. That improvement in methods of securing together pieces of stock which comprises applying methyl formate to hardened cement on at least one of said pieces of stock, retarding the evaporation of said methyl formate, and pressing said pieces of stock together.

5. A composition for softening hardened cellulose derivative cement comprising methyl formate, a small amount of dissolved cellulose derivative and a diluent having a boiling point of less than about 50° C.

6. A composition for softening hardened cellulose derivative cement comprising pyroxylin dissolved in a mixture of methyl formate and methylene chloride.

7. A composition for softening hardened cellulose derivative cement comprising pyroxylin dissolved in methyl formate and ether.

8. A composition for softening hardened cellulose derivative cement comprising pyroxylin dissolved in a mixture of methyl formate, ether and methylene chloride.

9. A composition for activating hardened nitrocellulose cement comprising liquid constituents of boiling point less than 50° C. and including a solvent for nitrocellulose and a non-solvent for nitrocellulose, and a solid constituent including nitrocellulose in amount sufficient to form a substantially saturated solution.

10. A cement softening composition comprising about 5 to 15% pyroxylin dissolved in a liquid mixture containing substantial quantities of each of methyl formate, ether, and methylene chloride.

11. A cement softening composition comprising from 5 to 15% pyroxylin, and approximately equal quantities of methyl formate, ether, and methylene chloride.

12. A cement softening composition comprising approximately ⅓ methyl formate, approximately ¼ ether, approximately ¼ methylene chloride, and pyroxylin of about 18-seconds viscosity.

13. A cement softening composition comprising the following ingredients in about the following proportions:

| | Grams |
|---|---|
| Nitrocellulose | 50 |
| Methyl formate | 200 |
| Ether | 150 |
| Methylene chloride | 150 |

14. That improvement in methods of securing together pieces of stock at least one of which is coated with hardened cellulose derivative cement which comprises applying to the surface of the hardened cement on at least one of said pieces of stock a solution of pyroxylin in a mixture of methyl formate and methylene chloride, and bringing the pieces of stock together under pressure.

15. That improvement in methods of securing together pieces of stock at least one of which is coated with hardened cellulose derivative cement which comprises applying to the surface of the hardened cement on at least one of said pieces of stock a solution of pyroxylin in a mixture of methyl formate and ether, and bringing the pieces of stock together under pressure.

JOSEPH W. JOHNSON.